G. L. PATTERSON.
BATTERY AND HOLDER.
APPLICATION FILED MAY 26, 1908.

980,830.

Patented Jan. 3, 1911.
2 SHEETS—SHEET 1.

Witnesses:

Inventor
G. L. PATTERSON
By his Attorneys

G. L. PATTERSON.
BATTERY AND HOLDER.
APPLICATION FILED MAY 26, 1908.
980,830.
Patented Jan. 3, 1911.
2 SHEETS—SHEET 2.
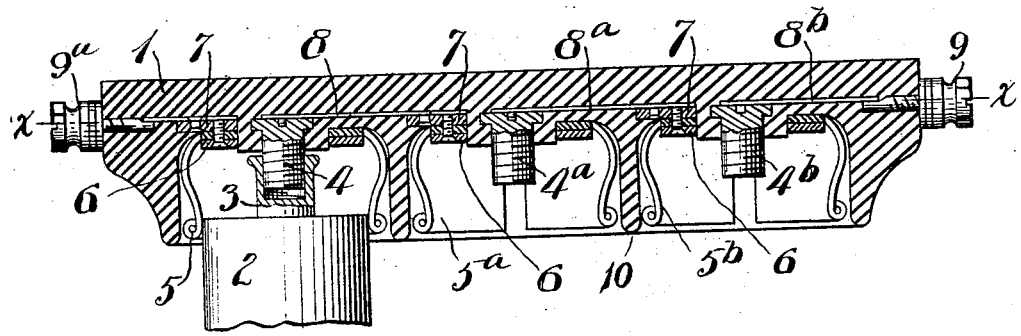
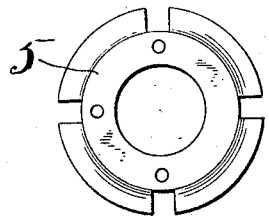
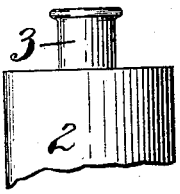
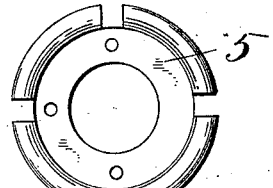
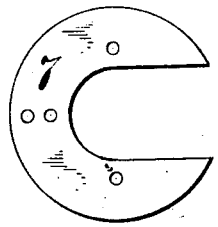
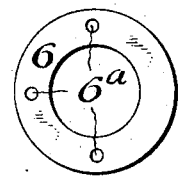
Witnesses:
Inventor
G. L. PATTERSON
By his Attorneys

UNITED STATES PATENT OFFICE.

GEORGE LEWIS PATTERSON, OF NEW YORK, N. Y., ASSIGNOR TO ALICE C. PATTERSON, OF NEW YORK, N. Y.

BATTERY AND HOLDER.

980,830.      Specification of Letters Patent.      Patented Jan. 3, 1911.

Application filed May 26, 1908. Serial No. 435,121.

*To all whom it may concern:*

Be it known that I, GEORGE L. PATTERSON, a citizen of the United States, residing at New York, N. Y., have invented certain new and useful Improvements in Batteries and Holders, of which the following is a full, clear, and exact description.

My invention relates to certain new and useful improvements in electric batteries and holders therefor, the same being of particular value in connection with dry battery construction. It is essentially an improvement upon that form of battery set forth in United States Letters Patent No. 705,919 to E. R. Gill, dated July 29, 1902.

Among the main objects of the invention are the provision of an effective holder whereby one or more battery units may be connected and disconnected, the provision of effective means for securing effective electrical connection for both terminals, and the provision of effective means whereby an exhausted battery cell may be quickly and easily replaced by a fresh one.

Figure 1:
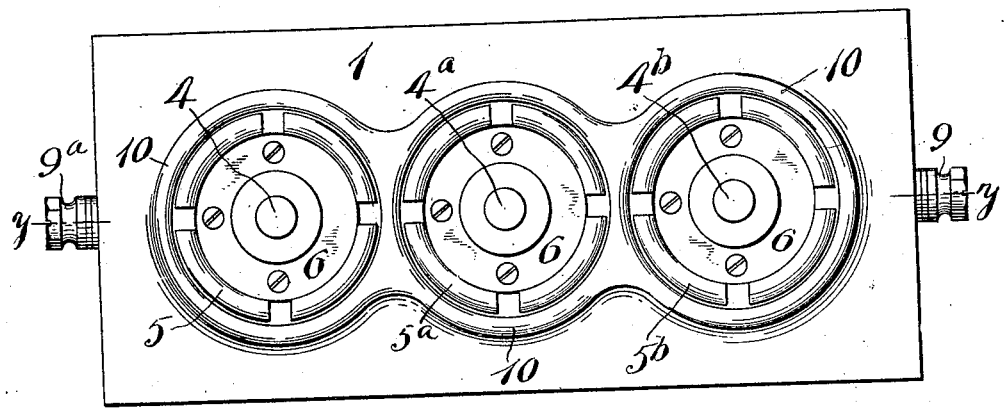
Figure 2:
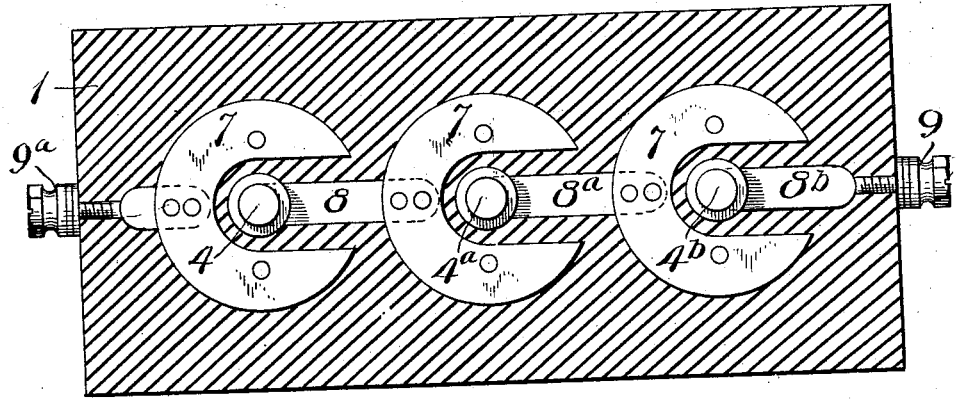

In the accompanying drawings Figure 1 is a plan view of the under side of the battery holder or head. Fig. 2 is a horizontal section on the plane of the line $x$—$x$ of Fig. 3. Fig. 3 is a vertical section on the plane of the line $y$—$y$ of Fig. 1. Fig. 4 is a side elevation of the upper end of a cell, detached. Fig. 5 is a view of the under side of the socket, detached. Fig. 6 is a top view of the same. Fig. 7 is a view of the bed plate. Fig. 8 is a plan view of a reinforcing ring or washer.

1 is the cell holder or insulating head, in this instance being adapted to receive a plurality of cells or units, the particular number shown being three.

2 represents the upper end of a single battery cell or unit, of the usual dry battery construction, and including an outside cup constituting one electrode of the battery, and a central end terminal 3 constituting the other electrode. The battery is charged with electrolyte in the usual manner, and sealed at one end around the exposed terminal 3.

4—$4^a$—$4^b$ are terminals carried by the head 1, their function being to make electrical connection with the center end terminal of the battery cells, they also affording a means for the mechanical connection of the battery cell and the holder, as hereinafter described.

5—$5^a$—$5^b$ are sockets arranged to receive the cupped body of each cell when the same are in place.

6 is an internal reinforcing washer within each socket 5 and designed to be secured to a bed plate 7 by means of suitable fastenings, such as screws adapted to pass through perforations $6^a$—$6^a$. The bed plate 7 is of U-shaped outline, preferably, and is anchored or embedded in the head 1, the latter being formed of insulating material, preferably a molded composition.

8 is a connector leading from fixed terminal 4 to the electrically opposite socket terminal $5^a$ in the next adjacent set of terminals. $8^a$ is a similar connector leading from terminal $4^a$ to terminal $5^b$, while $8^b$ is a connector leading from fixed terminal $4^b$ to a binding post 9.

$9^a$ is a binding post electrically connected with the socket terminal 5.

The battery terminal 3 is arranged to make a threaded connection with the fixed holder terminal 4, the screw-threads performing the double function of furnishing an effective mechanical means for fastening the parts 3 and 4 together, and at the same time, by reason of the irregular surface furnishing a more extensive surface engagement for the effective flow of current. In this latter respect, a particular advantage is gained, because ordinarily the central exposed terminal of a battery 3, being of necessity comparatively small, tends to a corresponding extent to prevent free current flow. By forming the threads in both of said parts, an extended surface contact is provided for this terminal and correspondingly increased efficiency results. As shown, the member 3 threads onto the outside of the member 4, but obviously a mere reversal of this order would produce equivalent results.

The sockets 5—$5^a$—$5^b$ are preferably slotted at several points, whereby the side walls are made yielding, and these may be properly curved to afford an easy entrance for the main body of the battery cell, with the result that when a cell is screwed into place a rubbing contact occurs between the sockets 5 and the external wall of the battery, which latter, being one of the electrodes, in ordinary practice is brightened and the contact surface rendered thereby highly efficient. Around each socket, or between the several sockets, is a wall 10, the function of which is to act as a non-conducting barrier between said sockets, to prevent short-circuiting.

By the use of a holder of this type, it is impossible to reverse polarity, the batteries may be quickly shifted, fresh batteries easily inserted, and all without the assistance of a skilled electrician, thereby making such a device available to the most inexperienced user.

What I claim is:

1. In a device of the character described, a battery holder including two terminals of opposite polarity, one of said terminals being located concentrically relatively to the other, the central terminal being screw-threaded to receive the threaded central terminal of a battery cell, a second set of terminals similar to the first, and a laterally projecting connector for electrically connecting two electrically opposite terminals of said two sets, the said connector being insulated.

2. In a device of the character described, a holder, two terminals of opposite polarity carried thereby and insulated from each other, one of said terminals being arranged to engage the outer wall of a battery cell, the other terminal being arranged within the first and screw-threaded to receive the central terminal of a battery cell, a second set of terminals similar to the first, and a laterally projecting connector for electrically connecting two electrically opposite terminals of said two sets, the said connector being insulated.

3. In a device of the character described, a holder of insulating material, a conducting bed-plate anchored therein, a socket having a yielding side wall rigidly carried by said bed-plate, said socket constituting one terminal of an electric circuit, another terminal of an electric circuit within said socket and carried by said holder, a battery adapted to said holder terminals, said battery having two electrodes arranged one within the other, and a screw-thread on the inner electrode arranged to mechanically engage the screw-thread of the threaded holder terminal and a second set of terminals similar to the first, and a laterally projecting plate or connector, electrically connecting the opposite terminals of said sets.

GEORGE LEWIS PATTERSON.

Witnesses:
R. C. MITCHELL,
CHAS. A. PEARD.